United States Patent [19]
Mares

[11] 4,157,883
[45] Jun. 12, 1979

[54] PROCESS AND APPARATUS FOR FORMING COMPOUND STRUCTURE OF VARIOUS PLASTIC MATERIALS IN MOLD HAVING APERTURED SLIDE PLATE

[76] Inventor: Pedro Mares, Sancho de Avila, 105-111, Barcelona, Spain

[21] Appl. No.: 872,645

[22] Filed: Jan. 26, 1978

[30] Foreign Application Priority Data

Jan. 26, 1977 [ES] Spain .................................. 455.627

[51] Int. Cl.² .......................... B29C 1/00; B29C 5/00; B29F 1/022
[52] U.S. Cl. .................................... 425/127; 264/255; 264/297; 264/328; 425/129 R; 425/130; 425/588
[58] Field of Search ................... 425/129 R, 130, 134, 425/588; 264/250, 255, 297, 328

[56] References Cited

U.S. PATENT DOCUMENTS

| | | | |
|---|---|---|---|
| 3,028,284 | 4/1962 | Reeves | 264/328 |
| 3,822,107 | 7/1974 | Wogerer | 264/245 |
| 3,825,637 | 7/1974 | Robin | 264/328 |
| 3,957,278 | 5/1976 | Rabe | 277/227 |

*Primary Examiner*—W. E. Hoag
*Attorney, Agent, or Firm*—Cushman, Darby & Cushman

[57] ABSTRACT

Upper and lower injection mold halves forming between them successive spaces defining the configuration of parts that are to be injection molded and integrally joined into a compound structure. Movable plate means are transversely disposed between the successive spaces and have an aperture. The plate means initially blocks fluid communication between successive spaces in the mold so that one part can be injection molded, followed by injection molding of the second part after the plate means has been moved so that its aperture allows the injected plastic material of the second part to flow through the aperture and into contact with the molded first part, thereby plastically uniting the two parts into an integral or compound structure.

4 Claims, 6 Drawing Figures

PROCESS AND APPARATUS FOR FORMING COMPOUND STRUCTURE OF VARIOUS PLASTIC MATERIALS IN MOLD HAVING APERTURED SLIDE PLATE

PREAMBLE

The present application refers to improvements in the manufacture of pieces of plastic material, of the type which is obtained by injection of the material in a fluid state to the interior of a mold of appropriate form, by the operation of a conventional injection molding machine which works at the proper temperature of the plastic material in question, and at the appropriate injection pressure and velocity.

There are many instances in which it is desirable to have a unitary or compound structure which is made of successive pieces of different plastic materials. An example is the rear lights or lens of vehicles, such as a set of lens including for example four sections: a red one for the normal tail light, another red one for the brake light, a yellow one for an intermittent light indicating either turning or a hazard condition, and a white section for a back-up light.

As is known, such sections have in the past been manufactured in the form of a box or frame with the various partial pieces of appropriate form and color forming an inseparable connection with the help of various means of closure which many times present problems of hermetic sealing. It is therefore desirable, in order to reduce costs, to obtain such various sections in one piece by a molding operation, to which end this invention is precisely directed.

This invention is specifically directed to a process and apparatus for producing a unitary or compound structure in such a manner that the successive sections thereof are plastically united notwithstanding the fact that adjacent sections may be of different grades, properties and/or colors of plastic materials. In addition, each of the respective materials forming the various sections occupies precisely the zone of the compound structure which predetermined therefor, even though the various plastic materials are joined or integrated into a single structure. In other words, the plastic material for one section is not allowed to occupy any space of the compound structure which is intended to be occupied by another plastic material.

To obtain this end, the successive spaces defined by injection mold halves have disposed between them a movable plate arrangement which in one position blocks fluid communication between the adjacent molding spaces while a part is being injection molded in one of those spaces. Thereafter, the plate arrangement, which has an aperture through it, is moved so that the aperture registers the adjacent molding spaces. Then, the second part is injection molded into the other space and the plastic material flows through that plate aperture to become integrally joined with the first part.

To aid in the further explanation of this invention, accompanying this specification are the following drawings which represent an illustrative but nonlimiting example of one embodiment of the present invention. In these drawings:

FIG. 1 is a partial vertical cross sectional view of an embodiment of this invention, FIG. 2 is another partial vertical cross section taken along the line II—II of FIG. 1, FIG. 3 is a plan view of the resulting product, FIG. 4 is the same partial vertical section as FIG. 1, except it shows the invention during the second stage, FIG. 5 is a partial vertical section taken along the line V—V of FIG. 4, and FIG. 6 is a plan view representing the compound product after its removal from the mold.

DETAILED DESCRIPTION OF THE DRAWINGS

Figure 1:
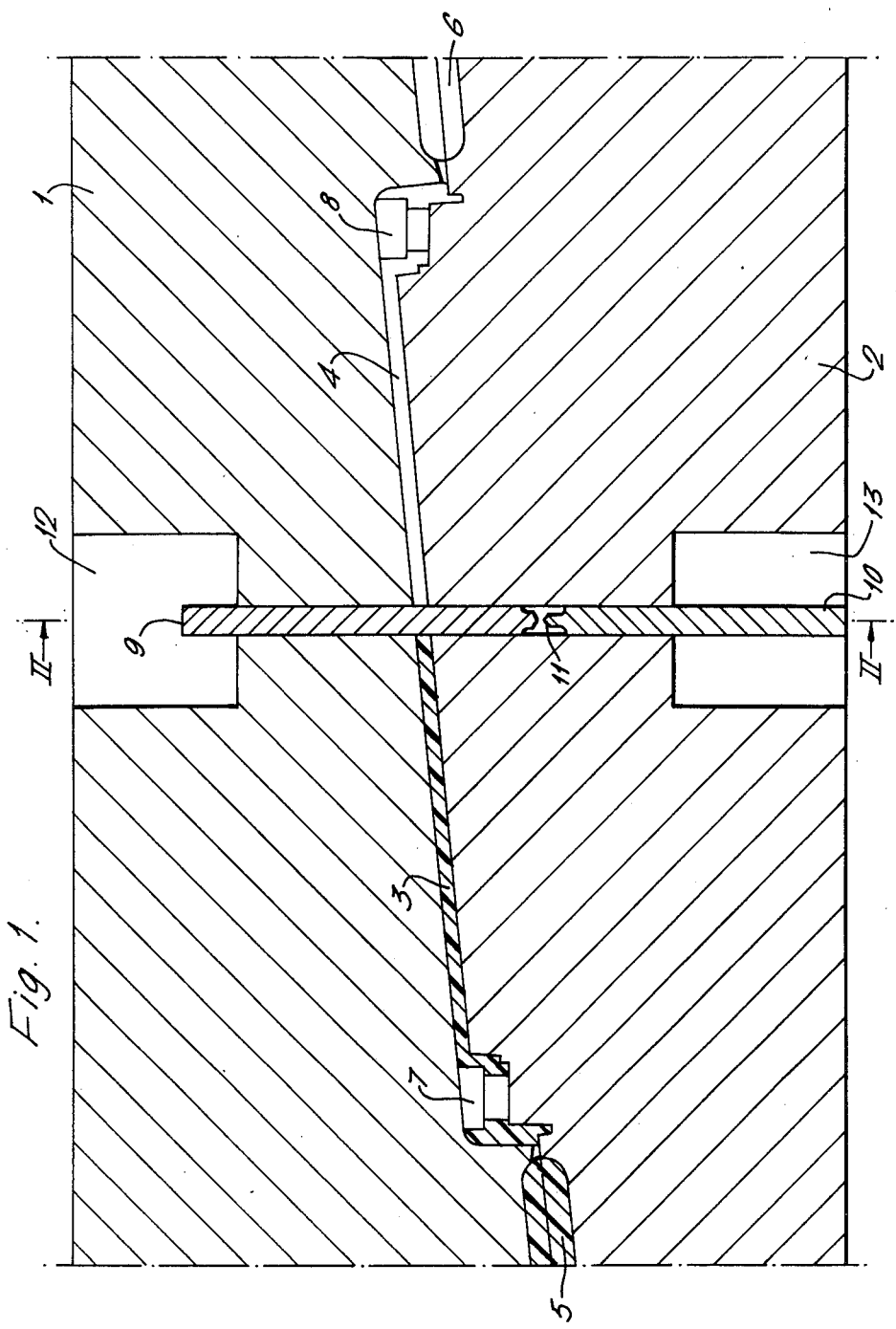
Figure 2:
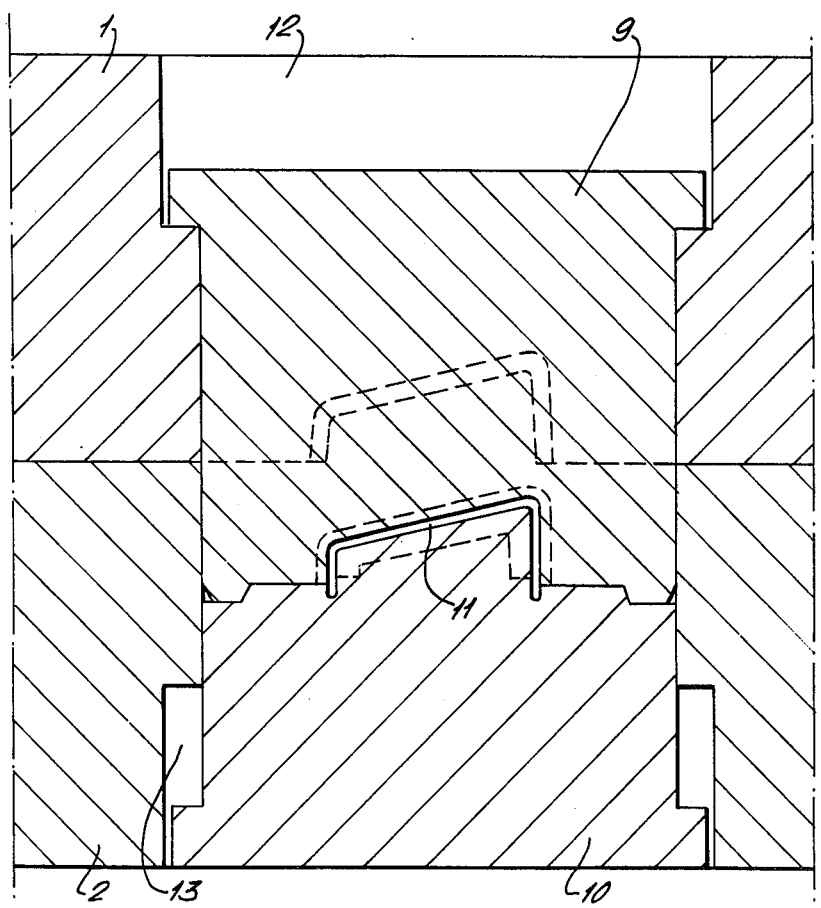

In FIGS. 1 and 2, the overall mold includes the upper half 1 and the lower half 2, which are constructed to form between them successive spaces 3 and 4. In turn, spaces 3 and 4 are configured or shaped to define the respective successive parts which are to be injection molded by this arrangement. The respective plastic materials for molding the parts in spaces 3 and 4 are injected thereinto through entrance conduits 5 and 6, respectively, in conventional manner. The left half of FIG. 1 indicates plastic material having been injected through conduit 5 and into space 3. For purposes of forming holes in the resulting molded parts, for example for screw or bolt heads or the like, buttons or plugs 7 and 8 are employed as shown, to occupy a certain space to allow the desired shape hole.

While the mold halves 1 and 2 define spaces 3 and 4, it is to be appreciated that these spaces would be contiguous, i.e., continuous, so as to effectively make one long space between plugs 7 and 8, if it were not for the intervening plate 9, which extends transversely of spaces 3 and 4, i.e., vertically in FIG. 1 as opposed to horizontally for spaces 3 and 4. Consequently, when plastic material is injected through conduit 5, it fills only space 3, and not space 4, since plate 9 is blocking fluid communication between spaces 3 and 4.

As is readily apparent from FIGS. 1 and 2, plate 9 cooperates with a lower plate 10 to form an aperture 11. As shown in FIG. 2, this aperture has a configuration which is generally similar to a squared inverted U shape with one short leg the bottoms of which are at the same level so that the top of the inverted U slopes. This configuration matches the configuration of spaces 3 and 4, as shown, but this matching configuration is not essential though preferred in order to make most of the compound structures contemplated by this invention.

FIGS. 1 and 2 also show zones or spaces 12 and 13 in which the extreme ends of plates 9 and 10 are disposed. These plates are movable vertically in the FIGS. 1 and 2 embodiment, and normally spaces 12 and 13 would be employed for any desired type of mechanism to aid the up and down movements required of plates 9 and 10, which may be accomplished by a hydraulic cylinder for example.

Figure 3:
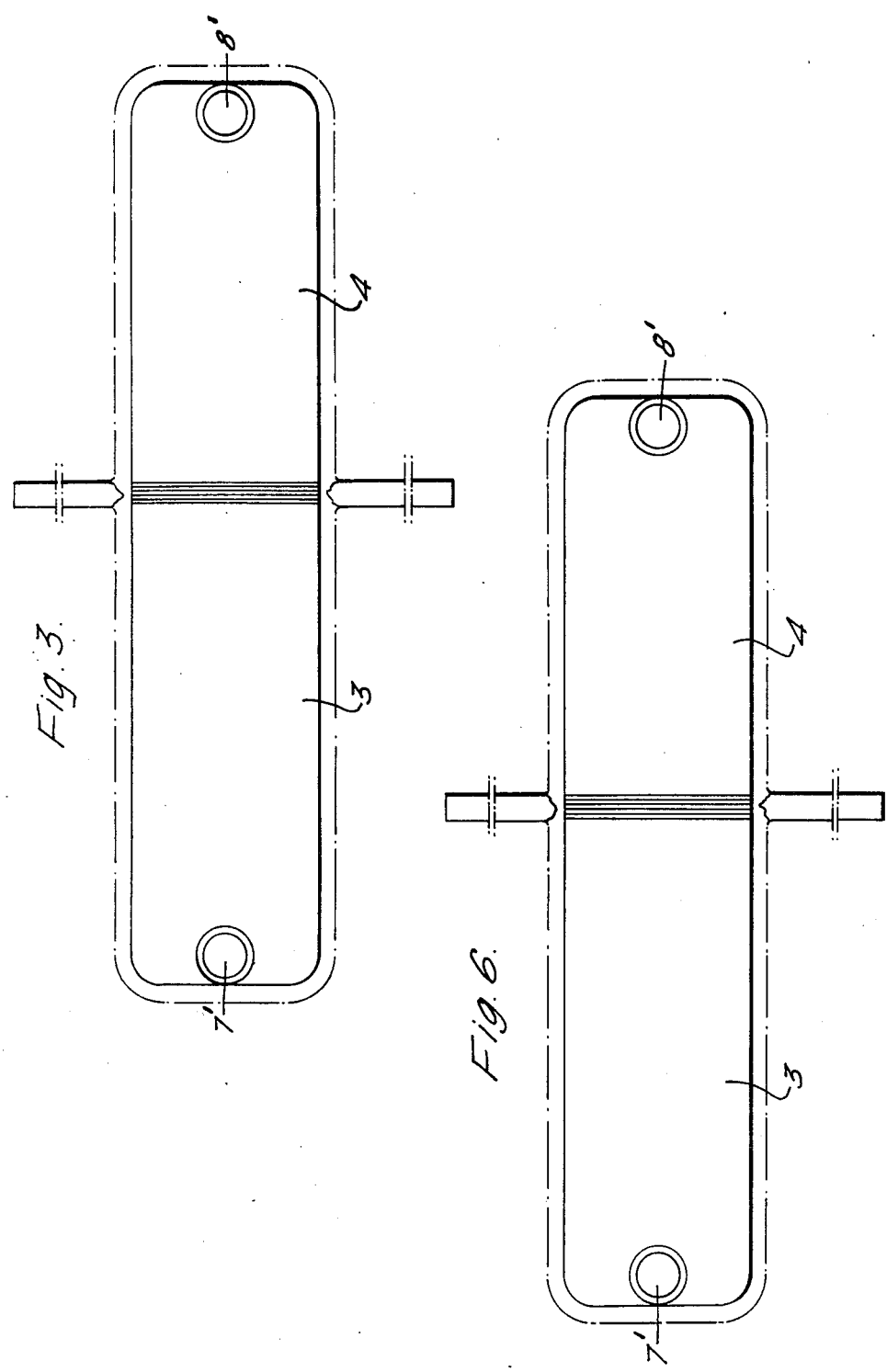
Figure 4:
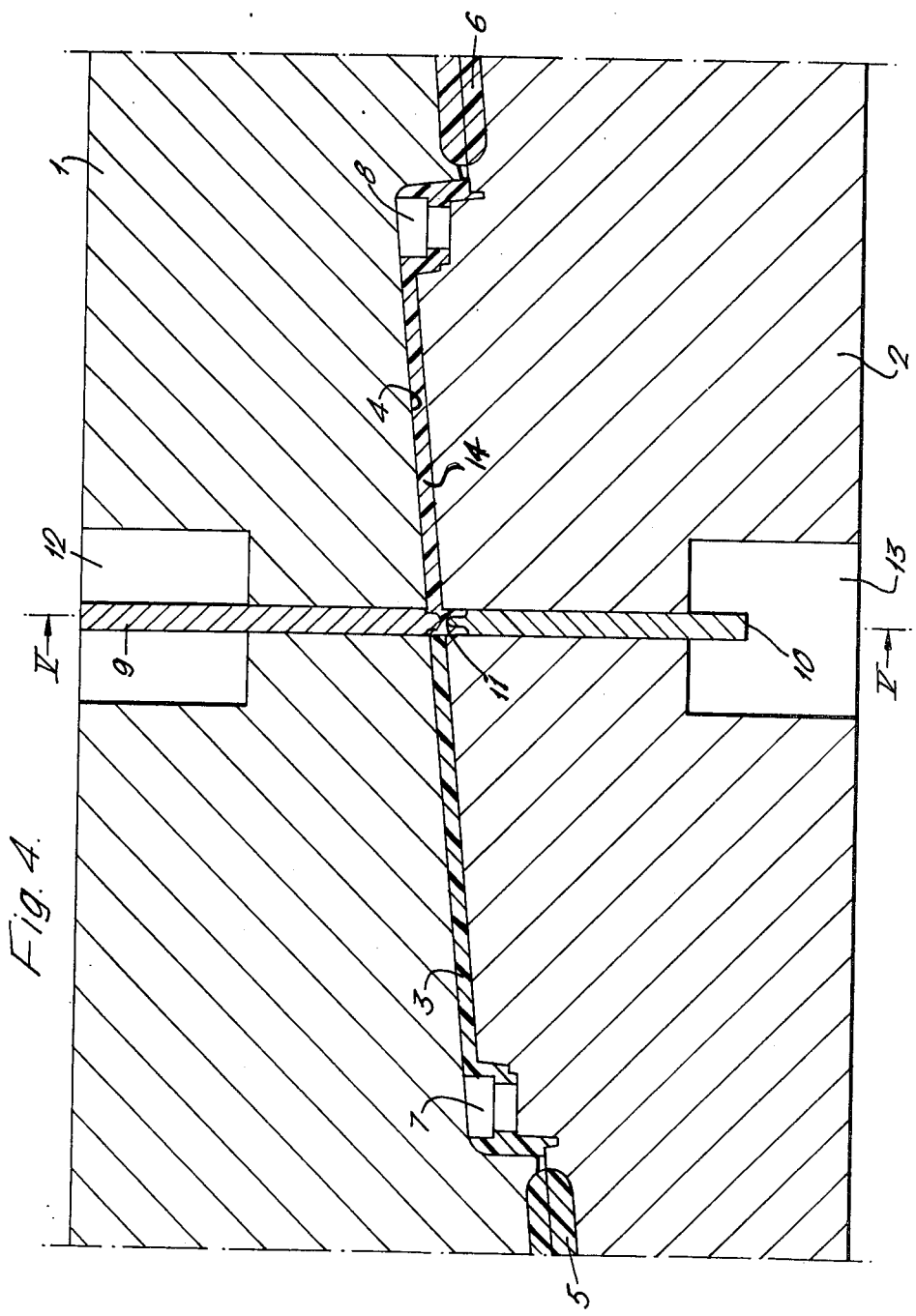
Figure 5:
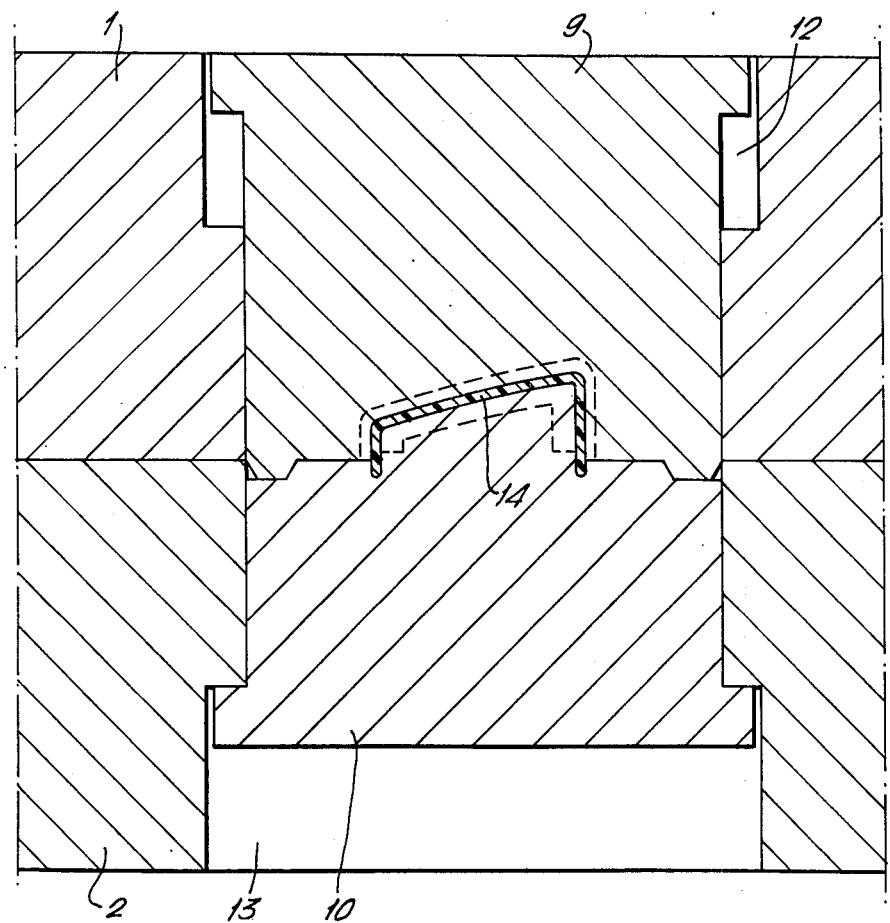

Before the plastic material in space 3 becomes hard, but generally after it has become hard enough not to flow significantly (or perhaps after it hardens if it is still moldable to the plastic material for the next space 4), plates 9 and 10 are moved upwardly to the positions shown in FIGS. 4 and 5. At this time a different plastic material 14 for the second piece to be molded in space 4 is injected through entrance conduit 6, and it not only fills space 4 but also aperture 11, thereby causing the two parts to become plastically united into an integral compound structure. It will be noted that spaces 3 and 4 slope, and particularly that the latter filled space 4 slopes down hill towards plates 9 and 10 so that plastic material 14 is aided in flowing through aperture 11 and joining the first molded part in space 3. After the two parts are thereby molded together and hardened, the resulting compound structure when removed from the mold is similar to that shown in FIGS. 3 and 6, in which the numeral 7' and 8' represent the apertures caused by plugs 7 and 8 in FIGS. 1 and 4.

In a manner similar to that described above, a compound structure composed of more than two different plastic materials may be obtained as will be readily apparent to those skilled in the art, keeping in mind that between each two successively adjacent spaces for different sections of the resulting compound structure, there must be movable plate means of the type designated 9 and 10 with an appropriately configured aperture of type 11 being registrable and nonregistrable by movement of the plate means to allow or block fluid communication between the two successively adjacent mold spaces.

It is therefore apparent that the above described structure provides for a process and apparatus by which the objects of this invention may be effected. While changes in the structure and process will be obvious to those of ordinary skill in the art, it is contemplated that all such changes shall be encompassed by the following claims.

I claim:

1. In injection molding apparatus, the improvement for plastically uniting a plurality of successive parts of respective plastic materials, comprising:
    first and second mold halves forming between them a plurality of successive spaces defining said successive parts for respectively receiving injections of said respective plastic materials, and
    plate means transversely disposed between successive spaces and having an aperture of predetermined configuration,
    said plate means being movable between (1) a first position in which it blocks fluid communication between two adjacent ones of said successive spaces so that one of said parts can be molded in one of those two spaces and (2) a second position in which fluid communication between said two adjacent spaces can occur via said aperture so that while a second one of said parts is being successively molded in the other of said adjacent spaces said second part is concurrently joined through said aperture to the adjacent part in said one space to form an integral structure of said two injection molded parts.

2. Apparatus as in claim 1 wherein the space for the later molded part runs down hill toward said plate means to aid in causing plastic material therein to flow through said aperture to cause said integral structure.

3. In an injection molding process, the improvement for plastically uniting a plurality of successive parts of respective plastic materials, comprising:
    moving plate means, which has in it a predetermined configured aperture, into a position to block fluid communication between two successive part molding spaces formed by an injection mold,
    then molding a part in a first one of said spaces from a said plastic material,
    moving said plate means so that fluid flows through said aperture and between said spaces, and
    then molding another part in the space on the other side of said plate means from a said plastic material including causing that plastic material to flow through said aperture to become united with said first molded part into an integral structure.

4. A process as in claim 3 wherein the plastic material for the two successively molded parts is different.

* * * * *